US012002483B2

(12) United States Patent
Yu et al.

(10) Patent No.: US 12,002,483 B2
(45) **Date of Patent: *Jun. 4, 2024**

(54) SYSTEMS AND METHODS FOR REDUCING WIND NOISE

(71) Applicant: Meta Platforms Technologies, LLC, Menlo Park, CA (US)

(72) Inventors: Gongqiang Yu, Redmond, WA (US); Michael Smedegaard, Bellevue, WA (US); Tetsuro Oishi, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/722,751

(22) Filed: Apr. 18, 2022

(65) Prior Publication Data

US 2022/0284913 A1 Sep. 8, 2022

Related U.S. Application Data

(63) Continuation of application No. 16/872,083, filed on May 11, 2020, now Pat. No. 11,308,972.

(51) Int. Cl.

*G10L 21/0232* (2013.01)
*G10L 25/18* (2013.01)
*H04R 1/40* (2006.01)
*H04R 3/00* (2006.01)
*H04R 3/04* (2006.01)

(Continued)

(52) U.S. Cl.

CPC .......... *G10L 21/0232* (2013.01); *G10L 25/18* (2013.01); *H04R 1/406* (2013.01); *H04R 3/005* (2013.01); *H04R 3/04* (2013.01); *H04R 29/005* (2013.01); *G10L 2021/02166* (2013.01); *H04R 2410/01* (2013.01); *H04R 2410/07* (2013.01)

(58) Field of Classification Search

CPC ........................ H04R 2410/07; G10L 21/0232
USPC ..................................... 381/94.1, 94.2, 94.3
See application file for complete search history.

(56) References Cited

U.S. PATENT DOCUMENTS 11,308,972 B1 * 4/2022 Yu .......................... H04R 1/406
2003/0147538 A1 8/2003 Elko (Continued)

FOREIGN PATENT DOCUMENTS

CN 101828335 A 9/2010
CN 106664486 A 5/2017

(Continued)

OTHER PUBLICATIONS

European Search Report for European Application No. 21170599.1, dated Feb. 3, 2022, 8 pages.

*Primary Examiner* — Katherine A Faley
(74) *Attorney, Agent, or Firm* — Foley & Lardner LLP

(57) ABSTRACT

The disclosure is generally directed to a system for reducing wind noise. A system includes one or more processors coupled to a non-transitory computer-readable storage medium having instructions encoded thereon that, when executed by the one or more processors, cause the one or more processors to obtain signals respectively generated from two or more microphones during a time period, the signals representing acoustic energy detected by the two or more microphones during the time period, determine a coherence between the signals, and determine a filter based on the coherence. The filter is configured to reduce wind noise in one or more of the signals.

15 Claims, 5 Drawing Sheets

(51) Int. Cl.
*H04R 29/00* (2006.01)
*G10L 21/0216* (2013.01)

(56) References Cited

U.S. PATENT DOCUMENTS

| | | | | |
|---|---|---|---|---|
| 2008/0260175 | A1 | 10/2008 | Elko | |
| 2013/0093770 | A1 | 4/2013 | Loewenstein | |
| 2013/0114835 | A1 | 5/2013 | Holmberg | |
| 2014/0341386 | A1* | 11/2014 | Cimaz .................... | H04R 3/005 381/71.6 |
| 2015/0142723 | A1 | 5/2015 | Loewenstein | |

FOREIGN PATENT DOCUMENTS

| | | | |
|---|---|---|---|
| CN | 109845287 | A | 6/2019 |
| CN | 110100453 | A | 8/2019 |
| CN | 110447073 | A | 11/2019 |
| EP | 2816818 | A1 | 12/2014 |

* cited by examiner

SYSTEMS AND METHODS FOR REDUCING WIND NOISE

CROSS-REFERENCE TO RELATED APPLICATIONS AND CLAIM OF PRIORITY

This application is a continuation of U.S. Ser. No. 16/872,083, filed on May 11, 2020, the entire contents of which is fully incorporated here by reference in its entirety.

FIELD OF THE DISCLOSURE

The present disclosure relates generally to audio systems. More particularly, the present disclosure relates to systems and methods for reducing wind noise.

BACKGROUND

The present disclosure relates generally to audio systems. Audio systems or devices may be utilized in a variety of electronic devices. For example, an audio system or device may include a variety of microphones and speakers to provide a user of a virtual reality (VR), augmented reality (AR), or mixed reality (MR) system with audio feedback and capabilities of communicating with another user or device. For example, an audio system may be utilized such that a user may speak in real-time to another user. In other examples, an audio device may be configured to listen for commands from a user and respond accordingly.

SUMMARY

One implementation of the present disclosure is related to a system configured to reduce wind noise, according to some embodiments. For example, an audio system may receive signals generated from one or more microphones. The signals may be indicative of acoustical energy detected by the respective microphone. However, the signals may include wind noise caused from wind or air movements around the respective microphones. The systems and methods described herein are configured to process the signals in order to reduce the amount of wind noise in the signals.

In an implementation, the system includes one or more processors coupled to a non-transitory computer-readable storage medium having instructions encoded thereon that, when executed by the one or more processors, cause the one or more processors to obtain signals respectively generated from two or more microphones during a time period, the signals representing acoustic energy detected by the two or more microphones during the time period, determine a coherence between the signals, and determine a filter based on the coherence, where the filter is configured to reduce wind noise in one or more of the signals.

In some embodiments, to determine the coherence, the non-transitory computer-readable storage medium has further instructions encoded thereon that, when executed by the one or more processors, cause the one or more processors to determine spectral densities for each the signals, and determine a cross-spectral density between the signals using the spectral densities.

In some embodiments, to determine the cross-spectral density, the non-transitory computer-readable storage medium has further instructions encoded thereon that, when executed by the one or more processors, cause the one or more processors to smooth the cross-spectral density using a smoothing factor and a second cross-spectral density generated from signals obtained from the two or more microphones during a second time period, where the second time period comprises a portion that was prior in time to the time period. In some embodiments, to determine the filter, the non-transitory computer-readable storage medium has further instructions encoded thereon that, when executed by the one or more processors to cause the one or more processors to determine a spectral gain between the signals, the spectral gain based on the coherence and determine the filter using the spectral gain and a band-pass filter.

In some embodiments, to determine the filter using the spectral gain and a band-pass filter, the non-transitory computer-readable storage medium has further instructions encoded thereon that, when executed by the one or more processors, cause the one or more processors to convolve the spectral gain and the band-pass filter and wherein the filter comprises an absolute value of the convolution of the spectral gain and the band-pass filter. In some embodiments, the band-pass filter comprises cutoff frequencies of desired low and high threshold and/or range. In some embodiments, the non-transitory computer-readable storage medium has further instructions encoded thereon that, when executed by the one or more processors, cause the one or more processors to apply the filter to the signals individually or apply the filter to a processed electrical signal, wherein the processed electrical signal comprises two or more of the signals.

Another implementation may relate to a device (e.g., a head wearable device). The device may include a first microphone and a second microphone positioned in different directions. The device may also include one or more processors communicably coupled to the first microphone and the second microphone. The one or more processors are also coupled to a non-transitory computer-readable storage medium that has instructions encoded thereon that, when executed by the one or more processors, cause the one or more processors to obtain a first signal generated from the first microphone, obtain a second signal generated from the second microphone, wherein the first signal and the second signal correspond to a time period, determine a coherence between the first signal and the second signal, and generate a filter based on the coherence, where the filter is configured to reduce an amount of wind noise detected by the first and second microphones.

In some embodiments, to determine the coherence, the non-transitory computer-readable storage medium has further instructions encoded thereon that, when executed by the one or more processors, cause the one or more processors to determine a first spectral density of the first signal, determine a second spectral density of the second signal, and determine a cross-spectral density between the first signal and the second signal. In some embodiments, to determine the cross-spectral density, the non-transitory computer-readable storage medium has further instructions encoded thereon that, when executed by the one or more processors, cause the one or more processors to smooth the cross-spectral density using a smoothing factor and a second cross-spectral density generated from signals corresponding to the first microphone and second microphone at a second time period, wherein the second time period comprises a portion that was prior in time to the time period.

In some embodiments, to generate the filter, the non-transitory computer-readable storage medium has further instructions encoded thereon that, when executed by the one or more processors, cause the one or more processors to determine a spectral gain between the signals and determine the filter using the spectral gain and a band-pass filter.

In some embodiments, to generate the filter using the spectral gain and a band-pass filter, the non-transitory computer-readable storage medium has further instructions encoded thereon that, when executed by the one or more processors, cause the one or more processors to convolve the spectral gain and the band-pass filter, where the filter comprises an absolute value of the convolution of the spectral gain and the band-pass filter. In some embodiments, the non-transitory computer-readable storage medium has further instructions encoded thereon that, when executed by the one or more processors, cause the one or more processors to apply the filter to the first signal or the second signal. In some embodiments, the non-transitory computer-readable storage medium has further instructions encoded thereon that, when executed by the one or more processors, cause the one or more processors to apply the filter to a processed electrical signal, wherein the processed electrical signal comprises the first signal and the second signal.

In another implementation relates to a method of reducing wind noise in signals generated from one or more microphones. The method includes obtaining, via one or more processors, a first signal generated via a first microphone and a second signal generated via a second microphone, where the first signal and second signal correspond to a time period, determining, via the one or more processors, a coherence between the first signal and the second signal, determining, via the one or more processors, a filter based on the coherence, and applying, via the one or more processors, the filter to reduce wind noise detected by the first microphone and the second microphone.

In some embodiments, determining the coherence between the first signal and the second signal includes determining a second spectral density of the first signal, determining a second spectral density of the second signal, and determining a cross-spectral density of the first signal and the second signal, wherein the cross-spectral density is filtered using a smoothing factor.

In some embodiments, determining the filter includes determining a spectral gain, convolving the spectral gain with a band-pass filter, the band-pass filter comprising a band in a speech range, and generating the filter by taking the absolute value of the convolution between the spectral gain and the band-pass filter.

In some embodiments, applying the filter includes convolving the filter with a Fast Fourier Transform (FFT) of the first signal and determining an inverse Fast Fourier Transform (IFFT) of the convolution of the filter and the FFT of the first signal. In some embodiments, applying the filter includes convolving the filter with a Fast Fourier Transform (FFT) of a processed signal, the processed signal comprising the first signal and the second signal, and determining an inverse Fast Fourier Transform (IFFT) of the convolution of the filter and the processed signal.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Referring generally to the FIGURES, systems and methods for audio systems are shown, according to some embodiments. In some embodiments, an audio system includes processing circuitry configured to be connected (e.g., communicably coupled) to peripheral devices. The peripheral devices may include a first microphone and a second microphone. In some embodiments, the peripheral devices may include additional microphones. The microphones are configured to sense or detect acoustic energy and generate a signal representative of the sensed or detected acoustic energy.

The processing circuitry is configured to receive a first signal from the first microphone and a second signal from the second microphone. The processing circuitry is configured to perform a wind reduction algorithm configured to reduce the amount of wind noise present within (e.g., detected by) the first signal and the second signal. The wind reduction algorithm includes receiving the first signal and the second signal, determining a coherence between the first and second signals, determining a filter based on the coherence, and applying the filter. In this way, the audio system is able to filter out wind noise captured by the first microphone and the second microphone. In particular, wind present in the environment may cause turbulence in or around physical structures of the first and second microphones, thereby causing wind noise to be present within the respective signals. The audio system is configured to determine the coherence (e.g., since it is assumed that wind noise is uncorrelated between channels due to differences in turbulence created around the different microphones) between the first channel (e.g., the first signal) and the second channel (e.g., the second signal) and filter out the wind noise based on the coherence. In some embodiments, the audio system may filter out the wind noise based on the coherence using spectral weighting, which may adjust magnitude of the signals and maintain the phase information. Thus, the audio system provides an improvement over prior systems by filtering out wind noise based on coherence, which improves audio quality.

Figure 1:
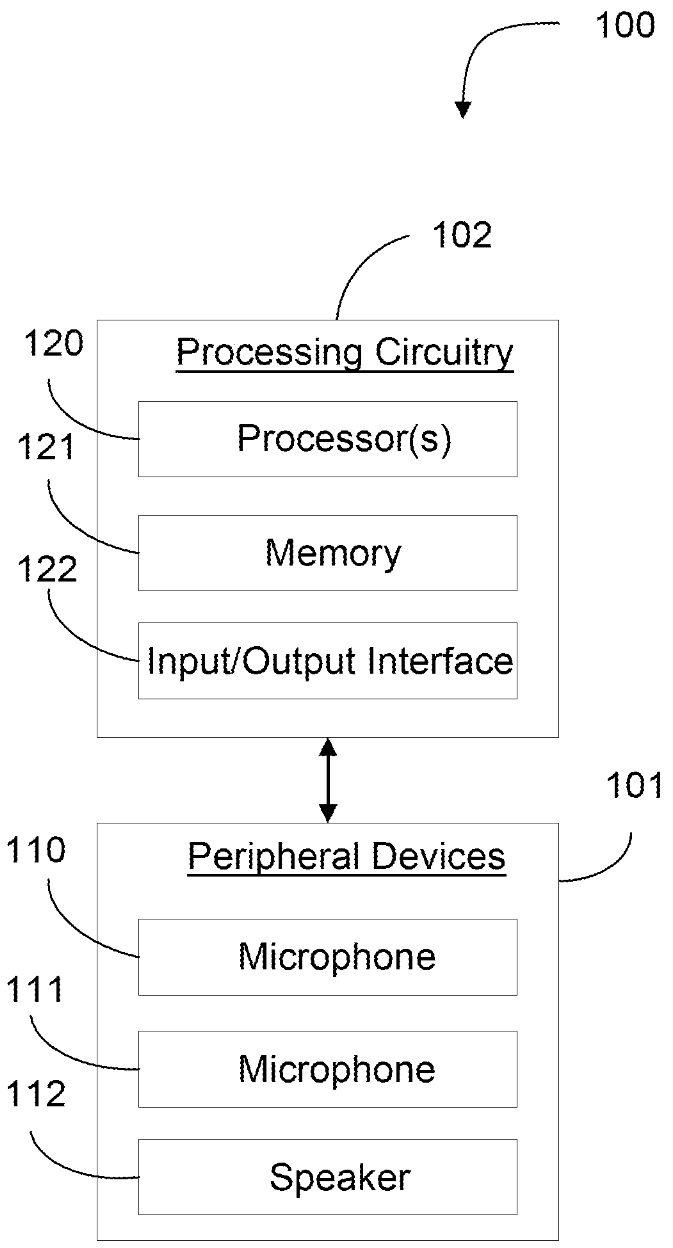
FIG. 1 is a block diagram of an audio system in accordance with an illustrative embodiment.

Referring now to FIG. 1, a block diagram of an audio system 100 is shown. The audio system 100 includes processing circuitry 102 configured to communicate with peripheral devices 101. In some embodiments, the audio system 100 may be integrated in various forms such as a glasses, mobile devices, personal devices, head wearable displays, wireless headset or headphones, and/or other electronic devices.

The peripheral devices 101 include a first microphone 110 and a second microphone 111. In some embodiments, the peripheral devices 101 may include additional (e.g., 3, 4, 5, 6, or more) microphones. The microphones 110 and 111 are configured to sense or detect acoustic energy and generate a respective signal (e.g., electrical signal) that is indicative of the acoustic energy. In some embodiments, the acoustic energy may include speech, wind noise, environmental noise, or other forms of audible energy. In some embodiments, the peripheral devices 110 may also include one or more speakers 112 or headphones configured to generate sound.

The processing circuitry 102 may include a processor 120, a memory 121, and an input/output interface 122. In some embodiments the processing circuitry 102 may be integrated with various electronic devices. For example, in some embodiments, the processing circuitry 102 may be integrated with a wearable device such as a head worn display, smart watch, wearable goggles, or wearable glasses. In some embodiments, the processing circuitry 102 may be integrated with a gaming console, personal computer, server system, or other computational device. In some embodiments, the processing circuitry 102 may also include one or more processors, microcontrollers, application specific integrated circuit (ASICs), or circuitry that are integrated with the peripheral devices 101 and are designed to cause or assist with the audio system 100 in performing any of the steps, operations, processes, or methods described herein.

The processing circuitry 102 may include one or more circuits, processors 120, and/or hardware components. The processing circuitry 102 may implement any logic, functions or instructions to perform any of the operations described herein. The processing circuitry 102 can include memory 121 of any type and form that is configured to store executable instructions that are executable by any of the circuits, processors or hardware components. The executable instructions may be of any type including applications, programs, services, tasks, scripts, libraries processes and/or firmware. In some embodiments, the memory 121 may include a non-transitory computable readable medium that is coupled to the processor 120 and stores one or more executable instructions that are configured to cause, when executed by the processor 120, the processor 120 to perform or implement any of the steps, operations, processes, or methods described herein. In some embodiments, the memory 121 is configured to also store, with a database, information regarding the localized position each of the peripheral devices, filter information, smoothing factors, constant values, or historical filter information.

In some embodiments, input/output interface 122 of the processing circuitry 102 is configured to allow the processing circuitry 102 to communicate with the peripheral devices 101 and other devices. In some embodiments, the input/output interface 122 may be configured to allow for a physical connection (e.g., wired or other physical electrical connection) between the processing circuitry 102 and the peripheral devices 101. In some embodiments, the input/output interface 122 may include a wireless interface that is configured to allow wireless communication between the peripheral devices 101 (e.g., a microcontroller on the peripheral devices 101 connected to leads of the one or more coils) and the processing circuitry 102. The wireless communication may include a Bluetooth, wireless local area network (WLAN) connection, radio frequency identification (RFID) connection, or other types of wireless connections. In some embodiments, the input/output interface 122 also allows the processing circuitry 102 to connect to the internet (e.g., either via a wired or wireless connection) and/or telecommunications networks. In some embodiments, the input/output interface 122 also allows the processing circuitry 102 to connect to other devices such as a display or other electronic devices that may receive the information received from the peripheral device 101.

Figure 2:
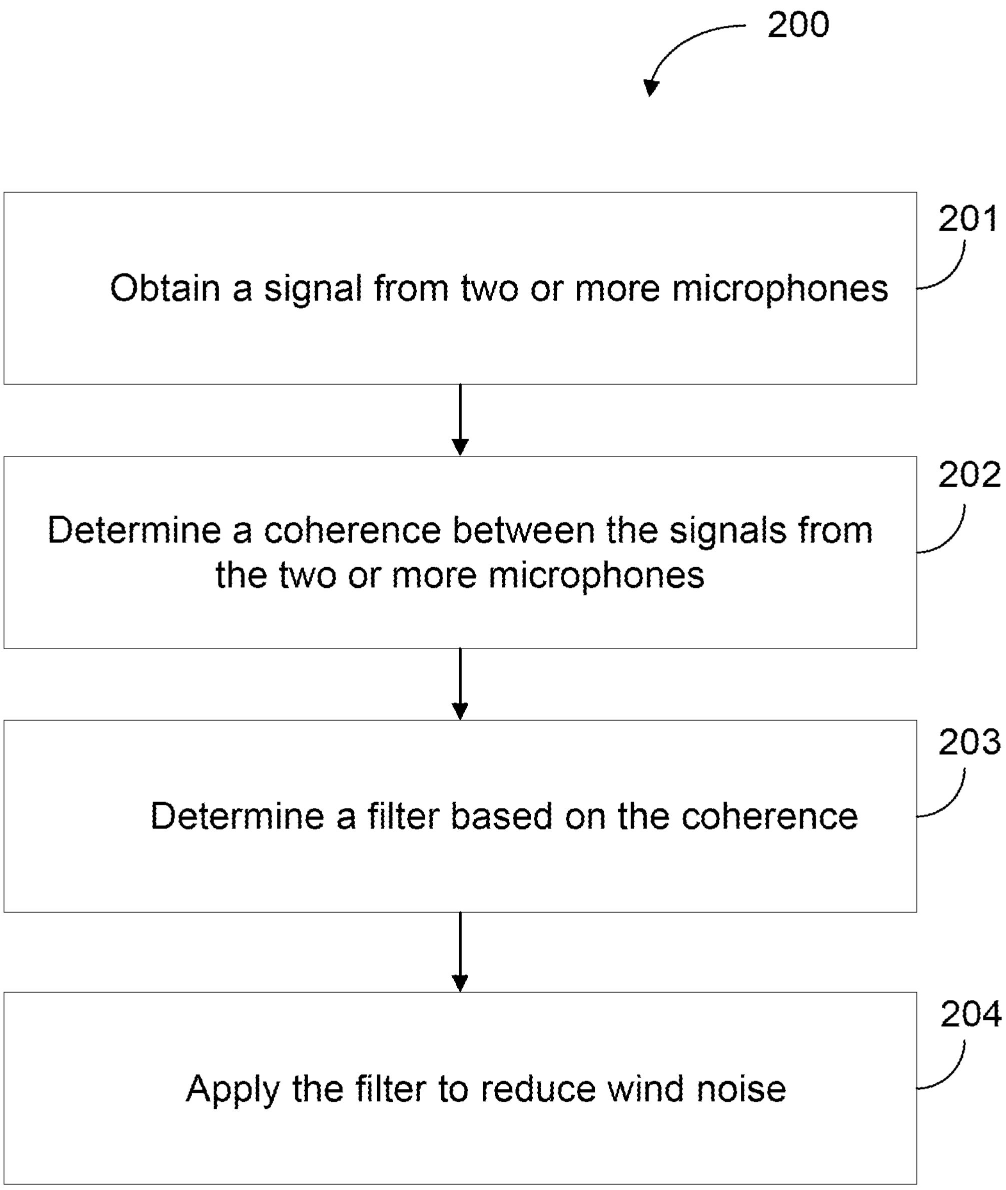
FIG. 2 is a flow diagram of a method of reducing wind noise in accordance with an illustrative embodiment.

Referring now to FIG. 2, a flow diagram of a method of reducing wind noise is shown in accordance with an illustrative embodiment. In an operation 201, signals from two or more microphones are received. The audio system may receive multiple signals from respective microphones or access the multiple signals from respective microphones from a buffer, database, or other storage medium. In some embodiments, the signals include a first signal generated by a first microphone and a second signal generated by a second microphone.

In an operation 202, a coherence between the signals from the two or more microphones is determined. For example, the audio system may determine a coherence between the first signal and the second signal. The coherence between the signals can be used to examine the relationship between the signals. For example, the coherence may be used to examine and correct for the wind noise or noise caused by uncorrelated air movements detected by the respective microphones. The uncorrelated portions of the signals may indicate that the signals include wind noise. In some embodiments, the audio system may generate a filter that is configured to reduce the magnitude of the uncorrelated portions of the signals and thereby filter out the wind noise. Examples of determining and using the coherence in order to reduce the wind noise in the signals is discussed in further detail below.

In an operation 203, a filter is determined or generated based on the coherence between the signals from the two or more microphones. For example, in some embodiments, the audio system may determine the filter by determining a spectral gain between the signals (e.g., the first and second signals) and convolving the spectral gain with a band-pass filter that has a band within the audible range (e.g., 200 hertz-8000 hz). In this way, the band-pass filter cuts off and filters out frequencies that are outside of the audible range and the spectral gain adjusts the magnitude of different portions of the band that are likely due to wind noise (e.g., because of the lack of correlation between the first and second signals) of the band-pass filter.

In an operation 204, the filter is applied to reduce wind noise. In some embodiments, the audio system may apply the filter to each of the signals. For example, the audio system may apply the filter directly to the first and second signals. As an example, the audio system may convolve the filter with a fast Fourier transform (FFT) of the first signal and take an inverse fast Fourier transform (IFFT) of the result to generate a filtered first signal. Similarly, the audio system may convolve the filter with the FFT of the second signal and take an IFFT of the result to generate a filtered second signal. The filtered first and second signals may then be further processed and/or transmitted.

In some embodiments, the signals may be processed first into one or more processed signals and the filter may be applied to the one or more processed signals. For example, in some embodiments, the first and second signals may be processed with a beamforming algorithm, acoustic echo cancelation (AEC) algorithm, active noise control (ANC) algorithm, and/or other algorithms that may cause the first and second signals to become a single processed signals. The audio system may apply the filter to the single processed signal in order to reduce the wind noise in the single processed signal. For example, a FFT the single processed signal may be convolved with the filter and an IFFT of the result may be taken to generate a filtered single processed signal.

Figure 3:
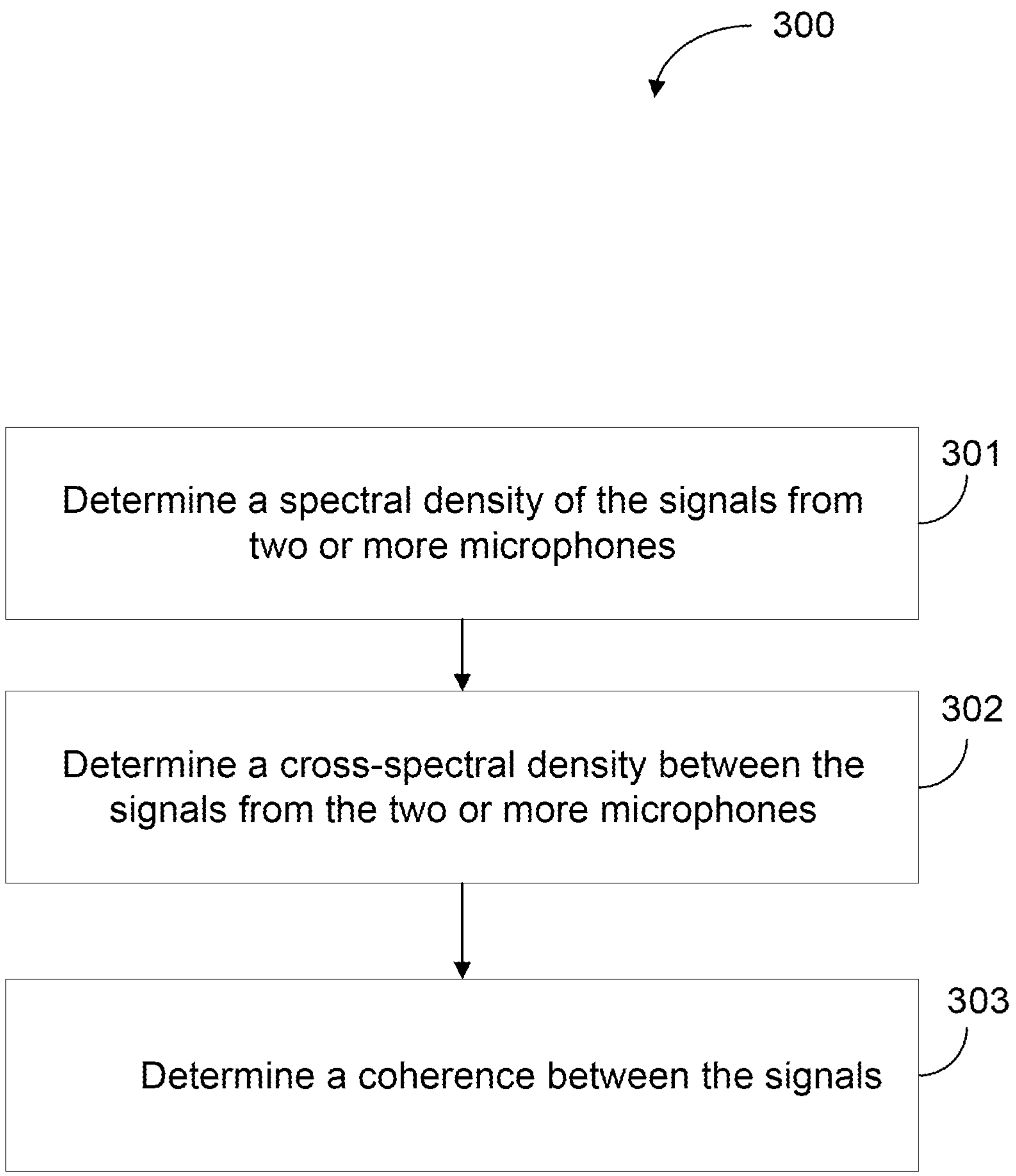
FIG. 3 is a flow diagram of a method of determining the coherence between two or more signals in accordance with an illustrative embodiment.

Referring now to FIG. 3, a flow diagram of a method determining the coherence between signals from two or more microphones is shown in accordance with an illustrative embodiment. In an operation 201, a spectral density of the signals from two or more microphones is determined. In some embodiments, the audio system 100 may process or sample the signals. For example, in some embodiments, the audio system may process the signals with a particular number of samples (e.g., 1024 samples), time stamp the signals (e.g., samples start at time k), have an overlap with prior signals (e.g., 512 samples may overlap from respective signals from the two or more microphones at a prior time), and have been sampled at a particular rate (e.g., 48 kilohertz). For example, the signals may include a first signal generated from a first microphone and a second signal generated from a second microphone. At a particular time (e.g., k), over a particular number of samples (e.g., 1024), a first FFT (e.g., discrete time FFT) of the first signal may be calculated and a second FFT (e.g., discrete time FFT) of the second signal may be calculated. In some embodiments, a spectral density of the first signal ($\Phi_{ii}$(w,k)) (e.g., where w is equal to the number of frequency bins, and k is equal to the time stamp) may be calculated by convolving the first FFT with a complex conjugate of the first FFT and a spectral density of the second signal ($\Phi_{jj}$(w,k)) may be calculated by convolving the second FFT with a complex conjugate of the second FFT. In other examples, other techniques of calculation may be used to calculate the spectral density of the first and second signals.

In an operation 302, a cross-spectral density of the signals from the two or more microphones is determined. For example, in some embodiments, the cross-spectral density ($\Phi_{ij}$(w,k)) between the first signal and the second signal may be calculated by convolving the first FFT with the complex conjugate of the second FFT. In other examples, other techniques of calculation may be used to calculate the spectral density of the first and second signals. For example, in some embodiments, the cross-spectral density ($\Phi_{ij}$(w,k)) may be calculated or estimated using equation (1):

$$\Phi ij(w,k)=\lambda(w,k-1)*\Phi ij(w,k-1)+(1-\lambda(w,k-1))*Xi*\text{conj}(Xj), \quad (1)$$

where λ(w, k−1) is a smoothing factor from an earlier (e.g., an immediate prior) time, Φij(w, k−1) is a cross-spectral density between the signals from the earlier time, Xi is an FFT of the signal corresponding to i (e.g., 1, 2, . . . etc.), and Xj is an FFT of the signal corresponding to j (e.g., 1, 2, . . . etc.). In some embodiments, the smoothing factor allows for smoothing (e.g., exponential smoothing or filtering) in the cross-spectral density. Calculation and updating the smoothing factor is discussed in further detail herein with respect to operation 303.

In an operation 303, a coherence between the signals is determined. In some embodiments, the audio system may determine the complex coherency spectrum between the signals. For example, the coherency spectrum may be calculated as shown in equation (2):

$$\Gamma(w,k)=\Phi ij(w,k)/\sqrt{\Phi ii(w,k)*\Phi jj(w,k)}. \quad (2)$$

In other examples, other techniques of calculation may be used to calculate the coherence, coherence spectrum, or the complex coherence spectrum between the signals from the microphones.

In some embodiments, the smoothing factor corresponding to the current time (λ(w, k)) may also be updated in operation 303. In some embodiments, the smoothing factor may be calculated as shown by equation (3).

$$\lambda(w,k)=\propto(w)-\beta(w)*|\Gamma(w,k)|. \quad (3)$$

Equation (3) shows that the smoothing factor (λ(w, k)) may be calculated for the current time (k) by multiplying a constant beta (β) the absolute value of the coherency spectrum Γ(w, k) and subtracting that product from a second constant alpha (∝). The constants beta and alpha may be experimentally determined and manually input or updated within the audio system. In some embodiments, alpha may be optimized constant determined based on the mics performance. In some embodiments, beta may be optimized constant determined based on the mics performance.

Figure 4:
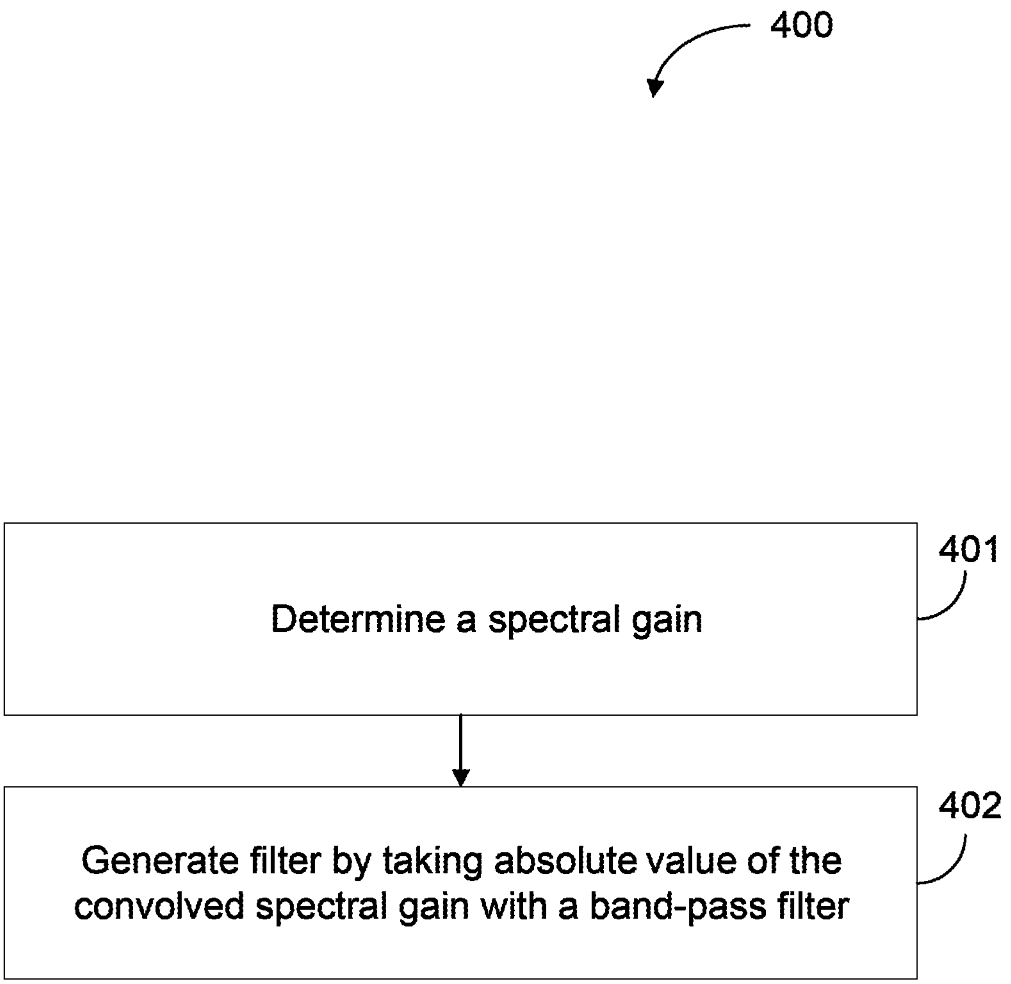
FIG. 4 is a flow diagram of a method of determining a filter for wind noise reduction in accordance with an illustrative embodiment.

Referring now to FIG. 4, a flow diagram of a method 400 of determining or generating a filter to reduce wind noise is shown in accordance with an illustrative embodiment. In an operation 401, a spectral gain (G(w,k)) of the signals is calculated. In some embodiments, the audio system calculates the spectral gain according to equation (4).

$$G(w,k)=\Phi ij(w,k)/((\Phi ii(w,k)*\Phi jj(w,k))/2) \quad (4)$$

The spectral gain G(w, k) may be representative of the signal to signal plus noise ratio (S/(S+N)) between the signals. In other embodiments, the spectral gain may be calculated using other calculation techniques.

In operation 402, the spectral gain is convolved with a band-pass filter and an absolute value of the product is taken in order to generate the filter. The audio system may convolve or calculate the convolution between the spectral gain and a band-pass filter stored in memory. The band-pass filter may have a band in the audible or speech range. For example, in some embodiments, the band-pass filter may have a lower cutoff frequency of 200 hertz (hz) (e.g., or in the range of 150 hz-300 hz) and an upper cutoff frequency of 8000 hz (e.g., or in the range of 7000 hz-9000 hz. As stated above, the spectral gain is indicated or representative of the signal to signal plus noise ratio (S/(S+N), thus the convolution of the band-pass filter and spectral gain that produces the filter having a band in the audible or speech range, where the band has adjusted magnitudes that act to filter out wind noise within the band. In other words, since the spectral gain is based on the correlation or coherence between the signals, the portions or frequency bands that are not coherent between the signals (e.g., due to the presence of wind noise) will be filtered out or reduced.

Figure 5:
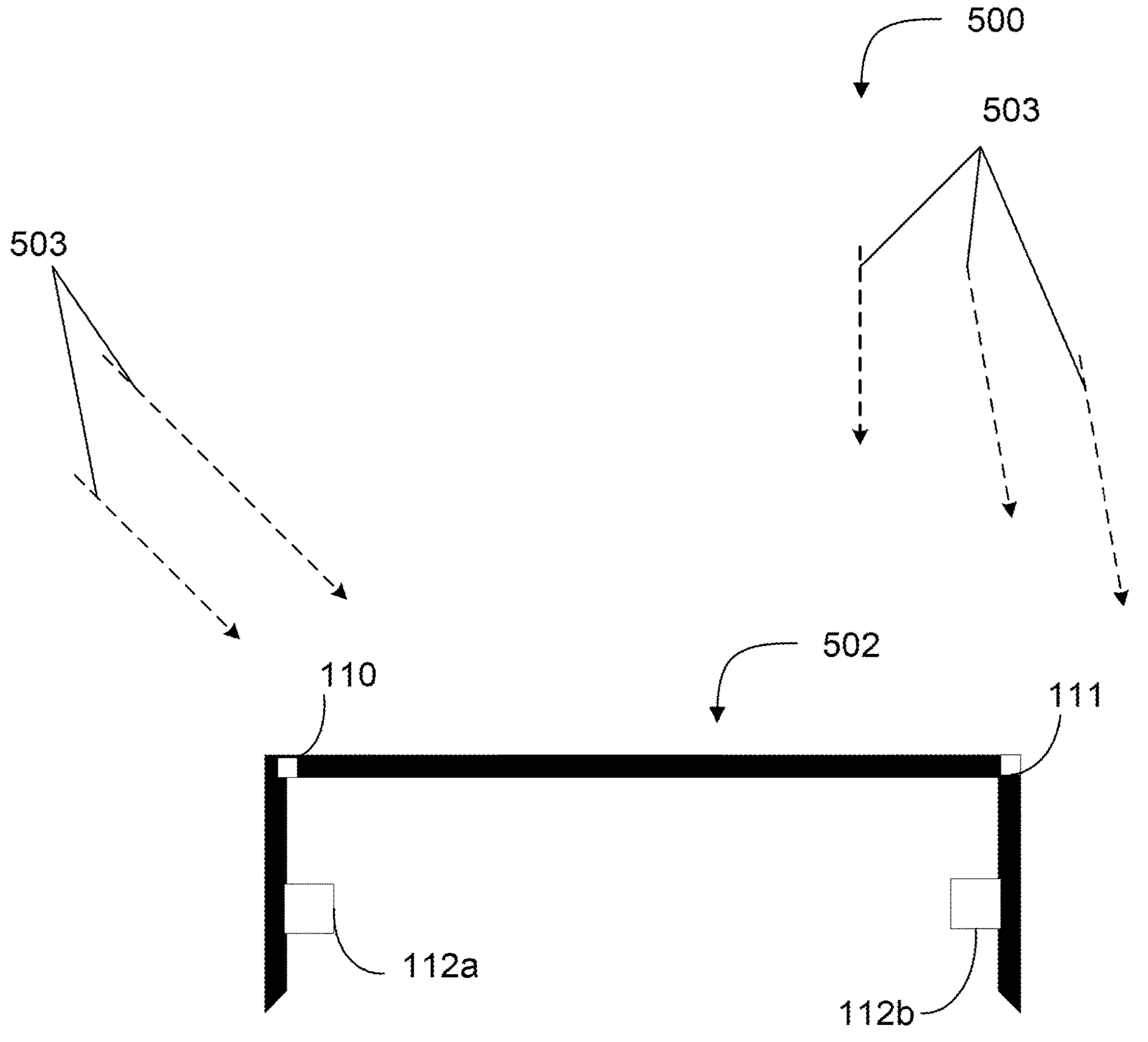
FIG. 5 is a diagram of a wearable device having an audio system in accordance with an illustrative embodiment.

Referring now to FIG. 5, a diagram 500 of a wearable device having an audio system is shown in accordance with an illustrative embodiment. The diagram 500 includes a wearable device 502 (e.g., glasses or eye box configured to be affixed to a head of a user) and wind vectors 503 that are passing by and impinging upon the wearable device 502. The wearable device 502 includes a first microphone 110, a second microphone 112. In some embodiments, the wearable device 502 may include additional microphones. The wearable device 503 also includes two speaker 112*a* and 112*b*. In some embodiments, the wearable device 503 may also include a display.

In an example, a user may wear the wearable device 502 and be in an environment where wind (e.g., or moving air relative to the device due to movements of the user) is present (e.g., represented by wind vectors 503). The wind or moving air may cause turbulence in or around ports or other structures of the microphones 110 and 111, thereby causing undesirable wind noise in a signal generated by the microphones 110 and 111. For example, the user may be outside on a jog and the substantial wind noise generated from the moving air may prevent the user from being able to talk to a person via the cellular network, give commands to a virtual assistant, or otherwise utilize the audio features. However, the audio system 100 may utilize the wind reduction algorithm to reduce the wind noise in the signals by filtering out the wind noise from the signal based on the coherence between a first signal generated from the first microphone 110 and a second signal generated from the second microphone 111, thereby improving the capabilities of the wearable device.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A system comprising:

one or more processors coupled to a non-transitory computer-readable storage medium having instructions encoded thereon that, when executed by the one or more processors, cause the one or more processors to:

obtain signals respectively generated from two or more microphones during a time period, the signals representing acoustic energy detected by the two or more microphones during the time period;

determine a coherence between the signals and a spectral gain between the signals based at least on the coherence; and determine and apply a filter as a convolution of the spectral gain based on the coherence and a band-pass filter configured to cutoff frequencies outside an audible range, the filter comprising an absolute value of the convolution of the spectral gain; and wherein the filter is configured to reduce wind noise in one or more of the signals.

2. The system of claim 1, wherein to determine the coherence, the non-transitory computer-readable storage medium having further instructions encoded thereon that, when executed by the one or more processors, cause the one or more processors to:

determine spectral densities for each the signals; and determine a cross-spectral density between the signals using the spectral densities.

3. The system of claim 2, wherein to determine the cross-spectral density, the non-transitory computer-readable storage medium having further instructions encoded thereon that, when executed by the one or more processors, cause the one or more processors to:

smooth the cross-spectral density using a smoothing factor and a second cross-spectral density generated from signals obtained from the two or more microphones during a second time period, wherein the second time period comprises a portion that was prior in time to the time period.

4. The system of claim 1, wherein the band-pass filter comprises cutoff frequencies of a low and high range.

5. The system of claim 1, the non-transitory computer-readable storage medium having further instructions encoded thereon that, when executed by the one or more processors, cause the one or more processors to:

apply the filter to the signals individually; or apply the filter to a processed electrical signal, wherein the processed electrical signal comprises two or more of the signals.

6. A device comprising:

a input/output interface configured to receive signals from multiple microphones; and one or more processors coupled to a non-transitory computer-readable storage medium having instructions encoded thereon that, when executed by the one or more processors, cause the one or more processors to:

obtain a first signal generated from a first microphone;

obtain a second signal generated from a second microphone, wherein the first signal and the second signal correspond to a time period;

determine a spectral gain between the first signal and second signal based at least on a coherence between the first signal and the second signal; and generate and apply a filter based at least on a convolution of the spectral gain the coherence and a band-pass filter configured to cutoff frequencies outside an audible range, the filter comprising an absolute value of the convolution of the spectral gain; and wherein the filter is configured to reduce an amount of wind noise detected by the first and second microphones.

7. The device of claim 6, wherein to determine the coherence, the non-transitory computer-readable storage medium having further instructions encoded thereon that, when executed by the one or more processors, cause the one or more processors to:

determine a first spectral density of the first signal;

determine a second spectral density of the second signal; and determine a cross-spectral density between the first signal and the second signal.

8. The device of claim 7, wherein to determine the cross-spectral density, the non-transitory computer-readable storage medium having further instructions encoded thereon that, when executed by the one or more processors, cause the one or more processors to:

smooth the cross-spectral density using a smoothing factor and a second cross-spectral density generated from signals corresponding to the first microphone and second microphone at a second time period, wherein the second time period comprises a portion that was prior in time to the time period.

9. The device of claim 8, wherein the band-pass filter comprises cutoff frequencies of 150-300 hertz (Hz) and 7000-8000 Hz.

10. The device of claim 9, the non-transitory computer-readable storage medium having further instructions encoded thereon that, when executed by the one or more processors, cause the one or more processors to apply the filter to the first signal or the second signal.

11. The device of claim 10, the non-transitory computer-readable storage medium having further instructions encoded thereon that, when executed by the one or more processors, cause the one or more processors to apply the filter to a processed electrical signal, wherein the processed electrical signal comprises the first signal and the second signal.

12. A method of reducing wind noise in signals generated from one or more microphones comprising:

obtaining, via one or more processors, a first signal generated via a first microphone and a second signal generated via a second microphone, wherein the first signal and second signal correspond to a time period;

determining, via the one or more processors, a spectral gain based at least on a coherence between the first signal and the second signal;

convolving, via the one or more processors, the spectral gain with a band-pass filter configured to cutoff frequencies outside an audible range comprising a band in a speech range;

generating, via the one or more processors, a filter by taking an absolute value of the convolution between the spectral gain and the band-pass filter; and applying, via the one or more processors, the filter to reduce wind noise detected by the first microphone and the second microphone.

13. The method of claim 12, wherein determining the coherence between the first signal and the second signal comprises:

determining a first spectral density of the first signal;

determining a second spectral density of the second signal; and determining a cross-spectral density of the first signal and the second signal, wherein the cross-spectral density is filtered using a smoothing factor.

14. The method of claim 12, wherein applying the filter comprises:

convolving the filter with a Fast Fourier Transform (FFT) of the first signal; and determining an inverse Fast Fourier Transform (IFFT) of the convolution of the filter and the FFT of the first signal.

15. The method of claim 14, wherein applying the filter comprises:

convolving the filter with a Fast Fourier Transform (FFT) of a processed signal, the processed signal comprising the first signal and the second signal; and determining an inverse Fast Fourier Transform (IFFT) of the convolution of the filter and the processed signal.

* * * * *